United States Patent
Denesuk et al.

(10) Patent No.: US 6,972,133 B1
(45) Date of Patent: Dec. 6, 2005

(54) DEGRADABLE ANIMAL CHEWING ARTICLE POSSESSING ENHANCED SAFETY, DURABILITY AND MOUTH-FEEL

(75) Inventors: Matthew Denesuk, San Jose, CA (US); Donald R. Uhlmann, Tucson, AZ (US)

(73) Assignee: Seefar Technologies, Inc., Tucson, AZ (US)

( * ) Notice: Subject to any disclaimer, the term of this patent is extended or adjusted under 35 U.S.C. 154(b) by 0 days.

(21) Appl. No.: 10/249,578

(22) Filed: Apr. 21, 2003

Related U.S. Application Data

(62) Division of application No. 09/578,199, filed on May 24, 2000, now Pat. No. 6,576,246.

(60) Provisional application No. 60/135,672, filed on May 24, 1999.

(51) Int. Cl.[7] ............ A61K 9/14; A61K 9/00; A01N 25/34
(52) U.S. Cl. ............ 424/484; 424/486; 424/400; 424/404
(58) Field of Search .............. 424/484, 486, 424/400, 404

(56) References Cited

U.S. PATENT DOCUMENTS

| | | | |
|---|---|---|---|
| 3,871,334 A | 3/1975 | Axelrod | |
| 3,887,699 A | 6/1975 | Yolles | |
| 4,364,925 A | 12/1982 | Fisher | |
| 4,419,372 A | 12/1983 | Greene et al. | |
| 4,513,014 A | 4/1985 | Edwards | |
| 4,557,219 A | 12/1985 | Edwards | |
| 4,681,758 A | 7/1987 | Fruthaler et al. | |
| 4,726,953 A * | 2/1988 | Carroll et al. | |
| 4,789,692 A | 12/1988 | Rei et al. | |
| 5,033,410 A | 7/1991 | Sigurdsson | |
| 5,114,704 A | 5/1992 | Spanier et al. | |
| 5,215,038 A | 6/1993 | O'Rourke | |
| 5,310,541 A | 5/1994 | Montgomery | |
| 5,321,064 A | 6/1994 | Vaidya et al. | |
| 5,339,771 A | 8/1994 | Axelrod | |
| 5,360,830 A | 11/1994 | Bastioli et al. | |
| 5,407,661 A * | 4/1995 | Simone et al. | |
| 5,409,973 A | 4/1995 | Bastioli et al. | |
| 5,419,283 A | 5/1995 | Leo | |
| 5,459,258 A | 10/1995 | Merrill et al. | |
| 5,462,983 A * | 10/1995 | Bloembergen et al. | |
| 5,476,069 A | 12/1995 | Axelrod | |
| 5,477,815 A | 12/1995 | O'Rourke | |
| 5,485,809 A | 1/1996 | Carroll | |
| 5,744,516 A | 4/1998 | Hashitani et al. | |
| 5,772,640 A | 6/1998 | Modak et al. | |
| 5,845,769 A | 12/1998 | Yeager | |
| 5,868,933 A | 2/1999 | Patrick et al. | |
| 5,941,197 A | 8/1999 | Axelrod | |

* cited by examiner

Primary Examiner—Thurman K. Page
Assistant Examiner—Humera N. Sheikh
(74) Attorney, Agent, or Firm—McGarry Bair PC

(57) ABSTRACT

A chewable, biodegradable article for use as a pet toy comprises a matrix made of a natural polymer, a synthetic organic polymer or a mixture thereof, a natural or synthetic fibrous material that comprises fibers and that is bonded chemically or physically with the matrix material, and, optionally, includes one or more microbe inhibiting agents that inhibit the growth of microbes in or on the article. The presence of the fibrous material inhibits formation of sharp edges upon breakage when the article is chewed, thereby rendering the article safer when used by pets. Also disclosed are processes for manufacturing the above article.

56 Claims, No Drawings

DEGRADABLE ANIMAL CHEWING ARTICLE POSSESSING ENHANCED SAFETY, DURABILITY AND MOUTH-FEEL

CROSS REFERENCE TO RELATED APPLICATION

This application is a divisional of U.S. patent application Ser. No. 09/578,199, filed May 24, 2000, now U.S. Pat. No. 6,576,246, which claims the benefit of U.S. provisional patent application Ser. No. 60/135,672, filed May 24, 1999.

BACKGROUND OF INVENTION

1. Field of the Invention

The invention relates to chewable articles intended primarily as chew toys for dogs or other domestic animals.

2. Description of the Background Art

Chewable animal articles such as artificial bones for dogs have been made of many materials and in many configurations and sizes. These have been made of compressed natural or food materials with a binding agent; some are made of synthetic polymers, as polymers mixed with protein (U.S. Pat. No. 4,681,758), nylon (U.S. Pat. No. 3,871,334) or polyurethane (U.S. Pat. Nos. 4,557,219 and 4,513,014).

Chewable articles are frequently constructed from degradable materials that possess at least a substantial component which degrades or otherwise diminishes substantially in structural integrity with usage and over time. The degradation, typically accelerated by the chewing action of the animals, is frequently accelerated by exposure to the moisture and/or digestive enzymes in saliva. The durability of such articles is therefore intrinsically limited.

If a chewable article is too soft, it is too easily ripped apart or shredded during use. On the other hand, if the article is too hard, it may tend to crack, shatter, or splinter. This tendency to splinter upon breakage or when otherwise structurally damaged is highly undesirable. Splintering leads to sharp edges that can cause injury and lead serious health problems for the animal, especially if sharp-edged material is swallowed. Moreover, small pieces breaking from the articles may also be swallowed and contribute to health problems.

Of the digestible type of mastication article, rawhide is the most popular type of mastication article (e.g., U.S. Pat. Nos. 5,114,704; 5,310,541; 5,476,069). Simulated rawhide mastication articles comprise oil seed protein, a polyol plasticizer, lecithin, and water, extruded into a ribbon (U.S. Pat. No. 4,419,372).

U.S. Pat. No. 5,407,661 discloses a digestible mastication article for a pet in which a starch, a cellulosic fibrous material (e.g., corncob fractions), a humectant, a proteinaceous binder and a tarter-control oral care additive. U.S. Pat. No. 5,419,283 discloses a molded mastication article comprising a starch material and a biodegradable ethylene copolymer. Other edible materials can be added as plasticizers or as lubricants. These materials are mixed in the presence of water for subsequent injection molding into desired shapes (e.g., a bone).

U.S. Pat. No. 5,477,815 discloses a molded dog mastication article comprising water absorbing nylon in which at least a surface layer has sugar incorporated therein.

U.S. Pat. No. 5,485,809 discloses animal chewing toys that shave away when chewed without puncturing, cracking, splintering or shattering, while providing satisfaction to the chewing animal. The chewing action is said to produce a desirable roughening and bristling of the surface that scours and cleans the animal's teeth. Flavoring material is uniformly dispersed throughout the body of the toy rather than just on the surface. The article is made from an ethylene/methacrylic acid copolymer, ionically cross-linked ionomer resin. This document discloses a desirable range of hardness (on a "D" scale—from 65 to 99, preferred range from 75 to 85).

U.S. Pat. No. 4,364,925 ('925) discloses chew-resistant products made from feed particulates with supporting fibers incorporated into the food components prior to compacting. Chew resistance is controlled primarily by the amount of such fibers. A multilayer article comprises at least one layer of a higher chew-resistance than the other layer, controlled by the amount and type of structure-supporting fibers. For example, supporting fibers are incorporated in the base layer of dry dog food and then a second layer is prepared without such fibers to yield a multilayer article having an inner hard, chew-resistant layer and an relatively soft and crumbly exterior layer. Alternatively, an inner layer is prepared without supporting fibers and a second layer with fibers is superimposed, leading to a hard exterior layer and soft interior layer. By starting with a soft-core layer and alternating the type of layers, multiple alternating harder and softer layers are produced. Such materials can serve as chew-resistant products that are sufficiently hard to exercise a pet's teeth and jaws and to remove plaque and tartar.

Suitable structure-supporting fibers are said to be any fibers that perform the function of binding the food into a unitized chew-resistant product and are not harmful. Such fibers may or may not be digestible by the animal. Safely digestible fibers include collagen. Indigestible fibers include cellulosic fibers or mixtures of animal-based digestible fibers and such indigestible fibers. Suitable sources of digestible fibers are animal tissue for example, skin, muscles, tendons, intestines, etc. The amount of animal hide material used as a source of collagen depends upon factors such as the type and amounts of fibers in the hide, the type of food in the product, whether swollen or unswollen collagen or hide binders or gels are employed, etc. As defined in this document, "collagen" includes other fibrous protein such as elastin, reticulin, etc. The bundles of fibers are said to be theoretically broken and realigned to form fiber interlocks. For maximum strength the cut fibers re-interlock in the final product so that relatively continuous fiber linkage bonds are maintained. Useful collagen fibers include those obtained from hides as well as those prepared by dissolving protein, precipitating the protein from solution and aligning the molecules to obtain a fibrous material. Protein fibers may also be derived from soy protein, egg white, wheat gluten, etc. The fibrous form of these proteins are spun into continuous aligned filaments to yield food forms which simulate the fiber of natural beef. The document cites Belgian Pat. 634,140, U.S. Pat. Nos. 3,071,477 and 3,197,310 and *Cereal Chem* 43 (2) 195 (1966).

According to the '925 patent, the supporting fibers are present in amounts sufficient to render the products chew-resistant, self-contained and unit-integral and to enable them to remain in compacted, shaped and molded form. The percent by weight of the indigestible fibers, or the mixture of the indigestible and digestible fibers in a unilayer food article may comprise up to about 50% or more, about 0.5–40%, about 1–30%, of about 1–10%, but preferably from about 1–5%. The optimum amount depends on factors such as the thickness, length, etc., of the fibers and the desired chew-life.

It is noteworthy that the '925 patent does not discuss breakage or splintering of the articles and the dangers they pose, nor does it address the objectives of the present invention. Rather, the '925 patent is primarily directed to pressed animal matter with added fibers that are intended to enable the overall material to retain a structure. Further, the processing involved in the '925 patent is that of baking, in essence making cookies or biscuits (wherein the added fibers provide a cohesiveness to the overall structure). Thus, the '925 patent deals essentially with baking of compacted animal flesh or feed incorporated with structure-supporting fibers; in the preferred mode, the fibers mutually interlock so that a continuous fiber network spans the article. Regardless, the processing and nature of the materials involved ensure that the fibers are of a static and correlated nature, closer in function and, in fact, closer to being a second matrix which intertwines with the first matrix.

SUMMARY OF INVENTION

According to the invention, a chewable, biodegradable article for pets (as a pet toy) comprises:
  (a) as a matrix, a natural polymer, a synthetic organic polymer or a mixture thereof;
  (b) a natural or synthetic fibrous material that comprises fibers and that is bonded chemically or physically with the matrix material, and
  (c) optionally, one or more microbe inhibiting agents that inhibit the growth of microbes in or on the article
  wherein, the presence of the fibrous material inhibits formation of sharp edges upon breakage when the article is chewed. The invention provides composite materials for safer and more durable chewable articles for pets.

The above article of further may further comprise one or more of a compatibilizer, a plasticizer and an inert particulate.

A preferred natural polymer for the matrix of the above article is a starch-based polymer.

In the above article of, the fibers having an average length of between about 0.1 $\mu$m and about 1200 $\mu$m, preferably between about 1 $\mu$m and about 1000 $\mu$m, most preferably about 5–500 $\mu$m.

In the above article, the length-to-diameter ratio of the fibers is greater than 25, and may be greater than 100. The weight fraction of the fibrous material relative to the weight of the article is between about 1 percent and about 30 percent, preferably between about 2 percent and about 15 percent.

The fibrous material in the above article may be a natural fibrous material, for example, comprising a collagen, a cellulosic, a polysaccharides, flax, hemp, cotton, wool or a mixture thereof. The fibrous material may also be a synthetic fibrous material, for example, a poly(alpha-hydroxy acid), nylon, polyester, or polyolefin, or even an inorganic oxide fiber.

In contrast to the '925 patent, the present invention utilizes polymeric materials which are processed in radically different way (polymer melt processing) than are the "biscuits" of the '925 patent (baking). Processing in the present invention involves elevated temperatures, shear rates, and pressures, resulting in final articles with profoundly different microstructural characteristics, such as a., relative lack of correlation in spatial distribution of the fibers (no spanning structures or clumping). Furthermore, the nature of the matrix in the present invention differs fundamentally from that in the '925 patent in that it is self-supporting. Thus, the polymers of the present chewable articles possess great cohesiveness and structural integrity on their own (without added fibers). Fibers (and/or other materials) are added to the articles of the present invention (1) to affect favorably the nature of the breakage processes and (2) to improve the "mouth-feel", all thee while without sacrificing desirable mechanical properties and degradability.

The above article preferably comprises one or more microbe inhibiting agents.

Also provided is a process for making a composite material that is formable into the above article, comprising combining the polymer or mixture of polymers, the fibrous material and, optionally, the microbe inhibiting agent, under conditions that result in a material that does not tend to splinter or form sharp edges when formed into a chewable article and subjected to chewing.

A process for manufacturing a chewable article comprises making the above composite material and forming the material into the article.

DETAILED DESCRIPTION

The present invention provides safer chewable articles for animals by incorporating binding material into the articles which (a) increase durability, (b) decrease the tendency for pieces to detach, and (c) inhibit formation of sharp edges upon breakage.

The degradable chewable articles of this invention are comprised of natural polymers, synthetic organic polymers or mixtures thereof.

A common class of biodegradable polymers is starch-based. Pure starch polymers do not possess the desired properties as they are brittle and are unduly affected by moisture. They are therefore commonly blended and/or reacted with other polymers. U.S. Pat. No. 5,321,064 describes a class of biodegradable polymers in which starch is reacted with synthetic polymeric material such as polyethylene, polystyrene, polypropylene and polyvinyl chloride. U.S. Pat. No. 5,409,973 describes a class of materials based on starch and an ethylene copolymer. U.S. Pat. No. 5,360,830 describes a similar material produced in expanded form. U.S. Pat. No. 5,459,258 describes a class of biodegradable materials based on the combination of hydrophobic polysaccharides, one thermoplastic and the other non-thermoplastic.

Biodegradable starch-based resins are available commercially from a number of manufacturers, such as Starchtech™, Novamont™ and Arizona Natural Materials™ Starchtech™ sells a series of such polymers under the "Re-NEW™" trade name. Novamont™ offers several classes of such polymers under the trade name, "Mater-Bi™."

A starch-based chewable article reinforced with natural fibers as described below is a preferred embodiment of this invention.

Biodegradable synthetic organic materials of poly($\alpha$-hydroxy acid) class including poly(lactic acid) (PLA), poly (glycolic acid) (PGA) resins, as well as poly lactide-glycolide (PLGA) copolymers have numerous desirable properties. (See: Ratner, BD et al., Eds., *Biomaterials Science*, Academic Press, New York, 1996, p. 64; Naitove, M., *Plastics Technology*, March 1995, p. 15.) A variety of commercial grades are available from Cargill, under the name "EcoPLA™," and also from various biomedical suppliers. Adjustment of the PGA:PLA ratio in a material can be used to fine-tune the texture, degree of hydrophilicity and rate of biodegradation. For example, PGA is more hydrophilic than PLA, so that increasing the PGA content will increase the hygroscopic property (uptake of water, saliva, or any other fluid). In addition, although PGA is highly crystalline, which generally slows its degradation, it becomes markedly less crystalline, and more degradable, when blended with PLA.

Materials based on polyhydroxybutyrate (PHB) are also attractive. One example, available commercially under the name Biopol™ comprises a blend with 3-hydroxyvaleric acid (PHV). PHB is generally highly crystalline, inflexible, and difficult to process. Blending with PHV diminishes the crystallinity, resulting in more flexible, more easily processed materials.

Polycaprolactone, either pure or blended with other materials, is a generally attractive degradable material that has found uses in medical applications such as sealing materials for wounds.

Other attractive degradable materials include, the poly (amino acids), the polyanhydrides, poly (ortho esters), and polyphosphazenes.

The nature of the present matrix differs fundamentally from the prior art in that it is self-supporting, meaning that it needs no reinforcements or other aids (such as fibers) in order for it to possess substantial structural integrity. Thus, the present matrix materials form "respectable" materials in their own right (in contrast to those, for example, disclosed in U.S. Pat. No. 4,364,925.

The polymer in the matrix is often combined with inert particulates, compatibilizers, plasticizers, etc. For a general reference, see *Plastics Additives and Modifiers Handbook*, J. Edenbaum, ed., Chapman and Hall, Great Britain, 1996, which is incorporated by reference in its entirety.

It is preferred to include one or more antimicrobial agents to inhibit the growth of mold or other microbes in the articles.

More durable and safer degradable chewable articles for animals are produced by including a fibrous material, preferably a natural fibrous material, in the article's formulation.

In preferred cases, the fibrous material forms chemical or physical bonds with the host material (the "matrix"). Chemical bonds are generally covalent or ionic bonds—powerful short-range interactions. "Physical" bonds generally refer to longer range interactions (e.g., dispersion forces) or structural interactions such as interlocking barb-like structures, interpenetration (like wood glue), etc. Both classes of bonding are well-known in the art of adhesion engineering.

Such fibers resist propagation of a clean breakage plane, thereby inhibiting formation of sharp edges upon breakage. This not only inhibits breakage but also forces those breaks that will necessarily occur to have a "bumpy" profile, thereby minimizing sharp edges.

The fibrous materials can be either of natural or synthetic origin. For formulation of articles that are relatively more (or more rapidly) degradable, natural fibrous materials are preferred because of their degradability upon exposure to saliva, enzymes, and other substances with which they come in contact during the acts of chewing and digestion. Also preferred are biodegradable synthetic polymer fibers such as the poly($\alpha$-hydroxy acids). In addition, presence of natural fibers may be preferred by consumers as they are perceived as being healthier for the animal.

In a preferred embodiment, fibers are incorporated into the chewable articles along with an a microbe-inhibiting ("MI") agent or compound. A MI compound is one that inhibits the growth, proliferation, spread, of any of a number of microorganisms, most importantly fungi (especially mold and yeast) and bacteria as well as algae, protozoa and various microscopic parasitic organisms. The most preferred compounds act in a manner that is not selective for any particular organism, but rather are inhibitory to a broad spectrum of microbial agents. The MI compound can act by any mechanism to inhibit growth of the organisms, whether biostatic or biocidal. The preferred compounds are not required to have a particular inherent level or threshold of activity to be useful in accordance with this invention. In general, the preferred MI compounds are not the highly selective antibiotics of the type used in human medicine. Presence of a MI agent or compound is especially important when using a natural or otherwise biodegradable material either as the matrix or as a binding element since such a material is especially susceptible to microbial invasion and degradation.

MI compounds useful in the present invention are described in more detail in commonly assigned application U.S. Ser. No. 09/513,703, filed Feb. 25, 2000, now U.S. Pat. No. 6,566,419, which also describes formulations and processes for incorporating these compounds. Below is a non-limiting description of some of these compounds.

A preferred MI compound is diiodomethyl-p-tolylsulphone ("DIMTS"). Paulus, W., *Microbicides for the Protection of Materials*, Chapman & Hall, 1993, which is hereby incorporated by reference, describes this and other biocidal and biostatic agents. This compound possesses a broad spectrum of anti-microbial activity, and is most active against fungi (including yeast) and algae. DIMTS is especially preferred in articles that may be partially or wholly digested.

DIMTS can cause yellowing in the final article, and if this is deemed unattractive, color suppressants can be added. DIMTS melts at about 157° C. It is relatively insoluble in water (0.0001 g/L at 25° C.). Acetone (350 g/L at 25° C.) and ethanol (20 g/L at 25° C.) are preferred solvents. DIMTS is generally stable over a pH range of about 4–10. A preferred form of DIMTS is the product Ultrafresh UF-95™, available from Thomas Research Associates. The concentration of UF 95™ in the finished product should be between about 0.001% to 3%, preferably between about 0.01% and 1% by weight percent. (Unless otherwise specified, all concentrations disclosed herein are given in weight %).

Triclosan (2,4,4"-trichloro-2-hydroxydiphenylether), another preferred MI compound, is sold by Ciba-Geigy under the trade name Irgasan DP-300 ™. It can be obtained as a crystalline powder or as a liquid concentrate. It is also available from Thomas Research Associates under the trade name Ultrafresh NM-100 ™ in a commercial form ready for compounding. Unmodified triclosan is insoluble in water;
  sparingly soluble in dilute alkali solution; and soluble in ethanol. It melts at about 60° C., and decomposes at about 285° C. It has an LD 50 oral toxicity of >5000 mg/kg for dogs. It is non-mutagenic, non-teratogenic and has good skin compatibility. Data for triclosan, along with that for many other MI agents, are given in Paulus, supra.

Ultrafresh NM-100 ™, a preferred form of triclosan, is added in quantities to achieve a final concentration in finished product between about 0.001% and 2%, preferably between about 0.004% and 0.3% by weight.

Bacticlean™ (alcohol ethoxylate 5–10%, benzalkonium chloride 1–5%, alkyl dimethylamine betaine 1–5%, alkylamine dicarboxylate sodium 1–5%) (Allied Resinous Products, Inc., Conneaut, Ohio) is a preferred MI "cocktail," i.e., a combination of compounds that work together to create broad-spectrum protection against microbial growth. Bacticlean™ is particularly preferred when processing with polyolefins.

Other preferred MI compounds include Vinyzene™ (OBPA (10,10"-oxy-bis-phenoxarsin)) (Rohm and Haas Company); Intercide™ (a tributyltin derivative) (AKZO Nobel, Inc., Chicago, Ill.); Fungitrol™ (N-(trichloromethylthio)phthalimide) (International Specialty Products Corporation, Wayne, N.J.). (N-(trichloro Cunilate™ (copper-bis-(8-hydroxyquinoline) (Rohm and Haas Company); Vancide™ (zinc dimethyldithiocarbamate) (R.T. Vanderbilt Company, Inc., Norwalk, Conn.) (N-tri Micro-Chek (2-N-octyl-4-isothiazolin-3-one) (Ferro Corporation, Cleveland, Ohio); Zinc Omadine (a zinc complex of pyrithione); and Apacider™ (silver hydroxyapatite) (Sangi Co., Ltd.; Sangi America, Thousand Oaks, Calif.).

In many cases, consumers may prefer articles that include or have been treated with natural MI agents. Garlic and turmeric are preferred sources of such materials, e.g., in the form of extracts or concentrates, but other natural spices or additives known in the art can be used as well.

A diffusible MI agent (such as triclosan or DIMTS) will diffuse into the surrounding material, thereby imparting the MI property to the material. This will generally diminish biodegradability of the article as the MI agent neutralizes or otherwise inhibits any of a number of biodegrading microbes, but will generally not diminish the degradability that results from the chewing action (e.g., the biodegradation caused by saliva, digestive enzymes, and aqueous fluids including water). Thus, this selective action of the MI agents can be exploited to fine-tune the degradability and sensitivity of the present chewable articles.

In the case of a strongly bonded or relatively non-diffusing MI (such as Dow Corning 5700), the MI property will remain only with the fibers, which will resist biodegradation, but will not be imparted to the rest of the article. This property is preferred when a more biodegradable product is desired.

Whether natural or synthetic, the fibrous materials used herein should be in the form of fibers of discrete lengths rather than continuous filaments. Useful fibers range in length from fractions of a millimeter to centimeters. Preferred fiber diameters are in the range of about 0.1–1200 $\mu$m, more preferably about 1–1000 $\mu$m most preferably about 5–500 $\mu$m. Preferred length-to-diameter (L/D) ratios exceed 10, preferably exceed 20, and most preferably exceed 25. Fibrous materials having L/D ratios exceeding 100 or even 1000 are also contemplated.

The fibrous materials are usefully employed in weight fractions (relative to the weight of the articles), ranging from 1 percent to 30 percent, preferably from 2 percent to 15 percent.

For articles having dimensions with a significant aspect ratio, e.g., articles shaped like bones for dogs, it is preferred that a significant portion (but not necessarily all) of the fibrous materials be oriented along the long dimension of the article, since this will provide resistance to crack propagation in response to the principal stresses imparted by chewing.

A wide range of natural fibrous materials may be used in the present invention. Preferred natural fibrous materials include collagens, cellulosics, polysaccharides, flax, hemp, cotton, wool or mixtures thereof. The collagen is preferably from an animal source.

A preferred natural material is cotton fiber. Cotton fiber may be obtained pre-compounded in commercial pellet form, e.g., in polypropylene or polyethylene pellets, where the cotton is typically seen as a lightweight filler. In a preferred embodiment, cotton-loaded synthetic polymer pellets are blended with a natural material, such as a starch-based material, and the resulting articles are molded into a desirable shape. Other synthetic polymers may also be included, along with compatiblizers or coupling agents.

Cotton fibers, cut into the appropriate lengths, may also simply be compounded with the base material as it is being pelletized. Alternatively, the fiber may be mixed with the compounded pellets in the hopper of an injection molding apparatus.

Synthetic fibrous materials may also be used. Useful synthetic fibrous materials include both organic and inorganic fibrous materials, with organic materials preferred. Examples of useful inorganic synthetic fibrous materials include carbon and glass, particularly fibrous glasses that are more water soluble than conventional fiberglass. Such as compositions based on modified sodium silicates. Nonlimiting examples of organic synthetic fibrous materials include nylons, polyesters and polyolefins. Preferred synthetic organic fibrous materials are the poly($\alpha$-hydroxy acids) such PGA, PLA and PLGA.

When using synthetic fibrous materials, a bonding agent is preferably present to encourages at least partial physical or chemical bonding of the fibrous materials with the matrix. The bonding agent can be a discrete chemical species which promotes bonding, such as a siloxane-based coupling agent, or may represent chemical units in the fibrous materials for which there exist complementary chemical units in the matrix or which have inherent bonding capabilities with chemical groups in matrix materials, e.g., the amide groups in nylon fibers.

Bonding may also be promoted by using maleated fibers (or other discrete binding elements) and/or the maleated matrix material.

The matrix can be wholly natural, wholly synthetic or a blend (either reactive or non-reactive) of at least one natural material and at least one synthetic material.

Preferred synthetic matrix components include polyolefins (e.g., polyethylene, polypropylene, polyisoprene, polystyrene), ethylene copolymers (e.g., poly-ethylene-vinyl alcohol, poly-ethylene-acrylic acid), polycapralactone, PGA, PLA and PLGA copolymers, polyurethanes, particularly polyether urethanes, polycarbonates, polyamides, polyesters, etc. Forms of these polymers that are rendered more reactive are preferred in cases where the natural matrix component is not particularly reactive or is otherwise less amenable to chemical or physical bonding. One means of accomplish such heightened reactivity is by forming the polymer grafted or otherwise incorporated with maleic anhydride.

Preferred natural matrix components include starcheous materials, proteinaceous materials, lignin and lipids. Starcheous materials can be obtained from potatoes, corn, wheat, rice, tapioca, etc. Preferred starcheous materials are derived from corn, wheat, and/or potatoes.

Proteinaceous materials can be derived from a variety of animal and vegetable sources well-known in the art. Preferred proteinaceous materials for use as matrix components are gelatins, casein, and collagens. Lipids can be derived from or incorporated as nuts, a milk product, vegetable oil or animal oil.

If the matrix material possesses substantial water or saliva sorption tendencies, it is expected that, through use, the matrix may be torn away from the binding material (e.g., the binding fibers) as the article expands. For this reason, when the water sorption tendency of the matrix material is substantial, the binding material is preferably selected from a group of materials with comparable or otherwise compatible sorption tendencies.

When discrete fibers of relatively short lengths, e.g., 0.05–1 mm, are employed as the binding agents, the chewable articles can be formed by known techniques such as injection molding, compression molding, extrusion and rotomolding.

When discrete fibers of relatively long lengths, e.g., multiple millimeters or more, are employed as binding agents, it is often useful to form at least a portion of the chewable article using techniques appropriate for long fibers, such as pultrusion. The portion of the article thus formed are then used as inserts in forming operations such as insert molding.

The matrix of the present chewable articles may include a number of inorganic or organic particulate materials, generally for the purpose of modifying and tailoring the (1) mechanical properties (2) thee aesthetics and (3) cost of the chewable articles. The preferred particle sizes of these particulate materials range from about 0.01 to about 100 $\mu$m, preferably from 0.02 to 50 $\mu$m.

A preferred organic particulate material is dextran which can be used, inter alia, to modify the degradation rate of the article.

Useful inorganic particulate materials include materials that contain significant amounts of (or that consist essentially of) titanium oxide, silicon oxide, carbon, aluminum oxide, hydroxide and oxy-hydroxide, calcium carbonate, feldspar, and kaolin. Because many such inorganic particulate materials are obtainable at lower cost than the cost of the organic constituents of the chewable articles, their use can lower the overall cost of producing the article. In addition, they have greater stiffness than the organic constituents, and can provide coloration and hiding power to the articles.

Generally larger particulates may be incorporated into the chewable articles in an effort to engineer the "mouth feel," which is the combination of consistency and texture that create a particular set physical sensations in the animal's mouth. For example, dogs often favor a "bumpy" texture. Dispersing larger particulates such as sand or other minerals throughout the article can enhance the bumpy texture.

Also useful are materials to modify the color, taste and aroma of the articles. Dyes, primarily food dyes, are especially important. Taste/aroma agents include materials derived from animal fats or animal skins as well as garlic and other vegetable products. Salt and other spices may also be used. Sorbitol can impart a pleasant taste in addition to serving as a plasticizer. Taste agents may be incorporated using particulates as vehicles.

A chewable article of any desired shape or size is formed from the biodegradable organic polymer compositions described above using methods well-known in the art.

Having now generally described the invention, the same will be more readily understood through reference to the following examples which are provided by way of illustration, and are not intended to be limiting of the present invention, unless specified.

EXAMPLE 12 lbs. of wheat starch powder, 4.0 lbs of low density polyethylene, 2.4 lbs. of sorbitol, 1 lb. of ethylene vinyl acetate grafted with maleic anhydride, 0.2 lbs of salt, and 0.4 lbs of fiber are blended and mixed together in a mixer. The fiber is comprised of cotton fiber of average length ~1 mm, and average L/D ratio of ~62.

The mixed batch is processed through an extruder at a temperature of 300° F. A rotating blade at the exit die of the extruder cuts the material into pellets. The pellets are suitable for injection molding into an appropriate shape for a chewable article.

The references cited above are all incorporated by reference herein, whether specifically incorporated or not.

Having now fully described this invention, it will be appreciated by those skilled in the art that the same can be performed within a wide range of equivalent parameters, concentrations, and conditions without departing from the spirit and scope of the invention and without undue experimentation.

While this invention has been described in connection with specific embodiments thereof, it will be understood that it is capable of further modifications. This application is intended to cover any variations, uses, or adaptations of the invention following, in general, the principles of the invention and including such departures from the present disclosure as come within known or customary practice within the art to which the invention pertains and as may be applied to the essential features hereinbefore set forth as follows in the scope of the appended claims.

What is claimed is:

1. An article for chewing by pets, which comprises:
   (a) a matrix comprising a starcheous or proteinaceous material or mixtures thereof in combination with a poly(alpha-hydroxy acid) polymer or copolymer or mixtures thereof;
   (b) a fibrous material comprising collagen fibers or cellulose fibers dispersed throughout the matrix;
   wherein the article is formed by extrusion or injection molding.

2. The article of claim 1 and further comprising one or more microbe-inhibiting agents.

3. The article of claim 1 in which said fibers are bonded chemically or physically to said matrix.

4. An article for chewing by pets, which comprises
   (a) a matrix comprising a starcheous or proteinaceous material or mixtures thereof in combination with a poly(alpha-hydroxy acid) polymer or copolymers or mixtures thereof; and
   (b) a fibrous material comprising fibers of poly(alpha-hydroxy acid polymer or copolymer or mixtures thereof dispersed throughout the matrix;
   wherein the article if formed by extrusion or injection molding.

5. The article of claim 4 and further comprising one or more microbe-inhibiting agents that are active against at least three classes of microorganisms selected from the group consisting of bacteria, fungi, yeast, algae and protozoa.

6. The article of claim 4 in which said fibers are bonded chemically or physically to said matrix.

7. An article for chewing by pets, which comprises
   (a) a matrix comprising a starcheous or proteinaceous material or mixtures thereof in combination with a polyolefin or polyethylene copolymer and with a poly (alpha-hydroxy acid) polymer or copolymer or mixtures thereof; and
   (b) a fibrous material comprising fibers of collagen or cellulosic or mixtures thereof or poly(alpha-hydroxy acid) polymers or copolymers or mixtures thereof dispersed throughout the matrix;
   wherein the article is formed by extrusion or injection molding.

8. The article of claim 7, wherein said matrix comprises a poly(alpha-hydroxy acid) polymer or copolymer or mixtures thereof together with a reactive combination of a starcheous or proteinaceous material with a polyolefin.

9. The article of claim 7 and further comprising one or more a microbe-inhibiting agents that are active against at least three classes of microorganisms selected from the group consisting of bacteria, fungi, yeast, algae and protozoa.

10. The article of claim 7 in which said fibers are chemically or physically bonded to said matrix.

11. An article for chewing by pets, which comprises:
   (a) a matrix comprising a starcheous or proteinaceous material; and
   (b) a fibrous material dispersed throughout the matrix and comprising collagen fibers, polysaccharide fibers or cotton fibers, which are chemically or physically bonded to said matrix.

12. The article of claim 11 wherein the matrix and fibrous material are formed into a shape suitable for chewing by pets by extrusion or injection molding.

13. The article of claim 11 which additionally contains one or more microbe-inhibiting agents that are active against at least three classes of microorganisms selected from the group consisting of bacteria, fungi, yeast, algae and protozoa.

14. The article of claim 13, wherein said microbe-inhibiting agent is selected from the group consisting of triclosan (2,4,4'-trichloro-2'hydroxydiphenol or ester thereof), diiodomethyl-p-tolysulphone, tri-n-butyl tin maleate, and 3-trimethoxy-silylpropyldimethyloctadecyl ammonium chloride, or mixtures thereof.

15. The article of claim 11 which additionally contains one or more of a compatibilizer or compatibilizers, a plasticizer or plasticizers, a particulate material or materials, a color modifier or modifiers, a taste agent or agents and aroma modifier or modifiers.

16. The article of claim 15, wherein said particulate material comprises particles selected from dextran, titanium oxide, silicon oxide, carbon, aluminum oxide, hydroxide and oxy-hydroxide, calcium carbonate, feldspar and kaolin, and mixtures thereof.

17. The article of claim 15, wherein said taste agent is derived from plants.

18. The article of claim 15, wherein said aroma modifier comprises an agent derived from animals.

19. The article of claim 15, wherein said taste agent is incorporated using particulates as vehicles.

20. The article of claim 11, wherein said starcheous material is derived from potatoes, corn, wheat, rice or tapioca.

21. The article of claim 11, wherein said fibrous material comprises collagen fibers, cellulose fibers or mixtures thereof.

22. The article of claim 11, wherein said fibrous material has an average fiber length between about 1 micron and 1000 microns, and wherein the length-to-diameter ratio of the fibers is greater than about 25.

23. The article of claim 11, wherein said proteinaceous material is derived from animal sources.

24. The article of claim 11, wherein said proteinaceous material is derived from plant sources.

25. The article of claim 11, wherein the weight fraction of said fibrous material relative to the weight of the article is between about 1 percent and about 30 percent.

26. The article of claim 11, wherein the article has a significant aspect ratio and a significant portion of said fibrous material is oriented along a long dimension of the article.

27. The article of claim 11, wherein the fibrous material and the matrix are selected to resist propagation of a clean breakage plane, thereby inhibiting formation of sharp edges upon breakage.

28. The article of claim 11, wherein said fibrous material is chemically treated to promote bonding to said matrix.

29. An article for chewing by pets, comprising:
   (a) a matrix comprising a starcheous or proteinacous material in combination with a synthetic biodegradable polymer; and
   (b) a fibrous material comprising at least one of collagen fibers, cellulose fibers, polysaccharide fibers, cotton fibers and fibers of poly(alpha-hydroxy acid) polymers or copolymers.

30. The article of claim 29 wherein the matrix and fibrous material are formed into a shape suitable for chewing by pets by extrusion or injection molding.

31. The article of claim 29 in which said synthetic biodegradable polymer comprises a poly(alpha-hydroxy acid) polymer or a poly(alpha-hydroxy acid) copolymer.

32. The article of claim 29 and further comprising one or more microbe-inhibiting agents that are active against at least three classes of microorganisms selected from the group consisting of bacteria, fungi, yeast, algae and protozoa.

33. The article of claim 29 wherein said microbe inhibiting agent is selected from the group consisting of triclosan (2,4,4'-trichloro-2'hydroxydiphenol or ester thereof), di iodomethyl-p-tolysulphone, tri-n-butyl tin maleate, and 3-trimethoxy-silylpropyldimethyloctadecyl ammonium chloride, and mixtures thereof.

34. The article of claim 29 and further comprising one or more of a compatibilizer or compatibilizers, a plasticizer or plasticizers, a particulate material or materials, a color modifier or modifiers, a taste agent or agents and aroma modifier or modifiers.

35. The article of claim 34 wherein said particulate material comprises particles selected from dextran, titanium oxide, silicon oxide, carbon, aluminum oxide, hydroxide and oxy-hydroxide, calcium carbonate, feldspar and kaolin, and mixtures thereof.

36. The article of claim 34 wherein said taste agent is incorporated using particulates as vehicles.

37. The article of claim 29, wherein said starcheous material is derived from potatoes, corn, wheat, rice or tapioca.

38. The article of claim 29, wherein said proteinaceous material is derived from animal sources.

39. The article of claim 29, wherein said proteinaceous material is derived from plant sources.

40. The article of claim 29, wherein said fibrous material has an average fiber length between about 1 micron and 1000 microns, and wherein the length-to-diameter ratio of the fibers is greater than about 25.

41. The article of claim 29, wherein the weight fraction of said fibrous material relative to the weight of the article is between about 1 percent and about 30 percent.

42. The article of claim 29, wherein said fibrous material is chemically or physically bonded to said matrix.

43. The article of claim 29, wherein said fibrous material is chemically treated to promote bonding to said matrix.

44. The article of claim 29, wherein the article has a significant aspect ratio and a significant portion of said fibrous material is oriented along a long direction of the article.

45. The article of claim 29, wherein the fibrous material and the matrix ai-e selected to resist propagation of a clean breakage plane, thereby inhibiting formation of sharp edges upon breakage.

46. The article of claim 1 and further comprising a particulate material.

47. The article of claim 1 and further comprising at least one biocidal microbe-inhibiting compound.

48. The article of claim 4 and further comprising a particulate material.

49. The article of claim 4 and further comprising at least one biocidal microbe-inhibiting compound.

50. The article of claim 7 and further comprising a particulate material.

51. The article of claim 7 and further comprising at least one biocidal microbe-inhibiting compound.

52. The article of claim 11 and further comprising at least one biocidal microbe-inhibiting compound.

53. The article of claim 29 and further comprising at least one biocidal microbe-inhibiting compound.

54. An article for chewing by pets, which comprises:

a matrix comprising a starcheous material or proteinaceous material or mixtures thereof;

a fibrous material comprising at least one of collagen fibers, cellulose fibers, polysaccharide fibers or cotton fibers, and poly(alpha-hydroxy acid) polymers or copolymers; and one or more biocidal microbe-inhibiting compounds.

55. The article of claim 54 wherein said fibrous material has an average fiber length between about 1 micron and 1000 microns, and wherein the average length-to-diameter ratio of the fibers is greater than about 25.

56. The article of claim 54 wherein the weight fraction of said fibrous material relative to the weight of the article is between about 1 percent and about 30 percent.

* * * * *